(12) United States Patent
Itou

(10) Patent No.: US 11,325,261 B2
(45) Date of Patent: May 10, 2022

(54) TRANSFER DEVICE AND DELIVERY SYSTEM

(71) Applicant: FANUC CORPORATION, Yamanashi (JP)

(72) Inventor: Masanori Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 263 days.

(21) Appl. No.: 16/814,364

(22) Filed: Mar. 10, 2020

(65) Prior Publication Data

US 2020/0306982 A1    Oct. 1, 2020

(30) Foreign Application Priority Data

Mar. 29, 2019   (JP) .............................. JP2019-066352

(51) Int. Cl.
*B25J 9/16* (2006.01)
*B25J 19/02* (2006.01)
(Continued)

(52) U.S. Cl.
CPC ............. *B25J 9/1697* (2013.01); *B25J 5/007* (2013.01); *B25J 9/1005* (2013.01); *B25J 9/1638* (2013.01); *B25J 19/023* (2013.01)

(58) Field of Classification Search
CPC ........ B25J 5/007; B25J 9/1005; B25J 9/1638; B25J 9/1697; B25J 19/023
See application file for complete search history.

(56) References Cited

U.S. PATENT DOCUMENTS

2016/0339587 A1    11/2016 Rublee
2018/0093380 A1*   4/2018 Yoshida ................. B25J 13/088
(Continued)

FOREIGN PATENT DOCUMENTS

JP    H05-346307 A    12/1993
JP    H09251309 A     9/1997
(Continued)

OTHER PUBLICATIONS

An Office Action; "Notice of Reasons for Refusal", mailed by the Japanese Patent Office dated May 11, 2021, which corresponds to Japanese Patent Application No. 2019-066352 and is related to U.S. Appl. No. 16/814,364; with English language translation.

*Primary Examiner* — Dale Moyer
(74) *Attorney, Agent, or Firm* — Studebaker & Brackett PC

(57) ABSTRACT

A control device of a transfer device has: a mark relative position calculation unit which calculates a relative position of the three compensation marks relative to the cart, based on a captured image of the camera; a posture calculation unit which calculates a posture of the robot arm which arranges the article at the delivery position, based on a relative position of the three compensation marks calculated by the mark relative position calculation unit, and a teaching positional relationship which is taught in advance as a positional relationship between the three compensation marks and the delivery position; a reference positional relationship determination unit which determines whether a mutual positional relationship between the three compensation marks matches with a reference positional relationship set in advance, based on the relative positions of the three compensation marks calculated by the mark relative position calculation unit; and a displacement notification unit which notifies to outside of a possibility of displacement of the three compensation marks, in a case of the reference positional relationship determination unit determining that the mutual positional relationship of the three compensation marks does not match with the reference positional relationship.

7 Claims, 3 Drawing Sheets

(51) Int. Cl.
B25J 9/10 (2006.01)
B25J 5/00 (2006.01)

(56) References Cited

U.S. PATENT DOCUMENTS

2018/0222056 A1* 8/2018 Suzuki .................... B25J 15/08
2018/0272535 A1* 9/2018 Ogawa .................. B25J 9/1692

FOREIGN PATENT DOCUMENTS

| JP | H11-077562 A | 3/1999 |
| JP | 2001-287183 A | 10/2001 |
| JP | 2002-154080 A | 5/2002 |
| JP | 2018-058142 A | 4/2018 |
| JP | 2018-126835 A | 8/2018 |
| WO | 2017/130361 A1 | 8/2017 |

* cited by examiner

TRANSFER DEVICE AND DELIVERY SYSTEM

This application is based on and claims the benefit of priority from Japanese Patent Application No. 2019-066352, filed on 29 Mar. 2019, the content of which is incorporated herein by reference.

BACKGROUND OF THE INVENTION

Field of the Invention

The present invention relates to a transfer device and a delivery system.

Related Art

Transfer devices have been used which include a mobile cart and a robot arm installed on the cart, and perform delivery of articles such as a workpiece with a target device such as a machine tool, for example. In such a transfer device, technology has been proposed which enables precise delivery of articles, by absorbing the relative positioning error between the cart and the target device (shift between coordinate system of robot and coordinate system of target device) in a state arranging the cart at a predetermined position relative to the target device by way of compensation of the operation of the robot arm (for example, refer to Patent Document 1).

Patent Document 1 discloses "a handling position/posture correction device for a mobile robot having a handling part, the handling position/posture correction device comprising: a storage means which stores a threshold value corresponding to each destination of the mobile robot; a reading means which reads out the threshold value corresponding to a current movement position of the mobile robot, from among the respective threshold values stored in the storage means; a camera which captures marks for handling position/posture correction provided at the current handling position of the handling part; a binarizing means which binarizes the data outputted by the camera by the threshold value read out by the reading means; a calculation means which calculates the current handling position and posture of the handling part, based on the data binarized by the binarization means; and a correction means which corrects the handling position and posture of the handling part, based on a comparison between the handling position and posture taught in advance and the current handling position and posture calculated by the calculation means.".

Patent Document 1: Japanese Unexamined Patent Application, Publication No. H9-251309

SUMMARY OF THE INVENTION

A handling position/posture correction device for a mobile body disclosed in Patent Document 1 is said to be able to stably and accurately recognize marks for correction (film-like sheet on which six circular marks are printed) even under any kind of lighting and illumination conditions. However, with the configuration of Patent Document 1, it is not possible to perform the appropriate processing, in a state in which a defect arises such as part of the plurality of circular marks constituting the correction marks being displaced, or stained and not visible. For this reason, it has been desired to provide a transfer device which can appropriately cope with displacement and staining of the correction marks.

A transfer device according to an aspect of the present invention is a transfer device which performs delivery of an article with a target device, the transfer device including: a mobile cart; a robot arm provided to the cart and able to grasp the article at a leading end thereof; a camera provided to the cart or the robot arm, and capturing three compensation marks which are attached to an outer surface of the target device; and a control device which enables delivery of the article at a predetermined delivery position in the target device, by controlling operation of the robot arm in consideration of an image captured by the camera, in which the control device includes: a mark relative position calculation unit which calculates a relative position of the three compensation marks relative to the cart, based on a captured image of the camera; a posture calculation unit which calculates a posture of the robot arm which arranges the article at the delivery position, based on a relative position of the three compensation marks calculated by the mark relative position calculation unit, and a teaching positional relationship which is taught in advance as a positional relationship between the three compensation marks and the delivery position; a reference positional relationship determination unit which determines whether a mutual positional relationship between the three compensation marks matches with a reference positional relationship set in advance, based on the relative positions of the three compensation marks calculated by the mark relative position calculation unit; and a displacement notification unit which notifies to outside of a possibility of displacement of the three compensation marks, in a case of the reference positional relationship determination unit determining that the mutual positional relationship of the three compensation marks does not match with the reference positional relationship.

According to the present disclosure, it is possible to provide a transfer device which can appropriately cope with displacement or staining of the compensation marks.

DETAILED DESCRIPTION OF THE INVENTION

Figure 1:
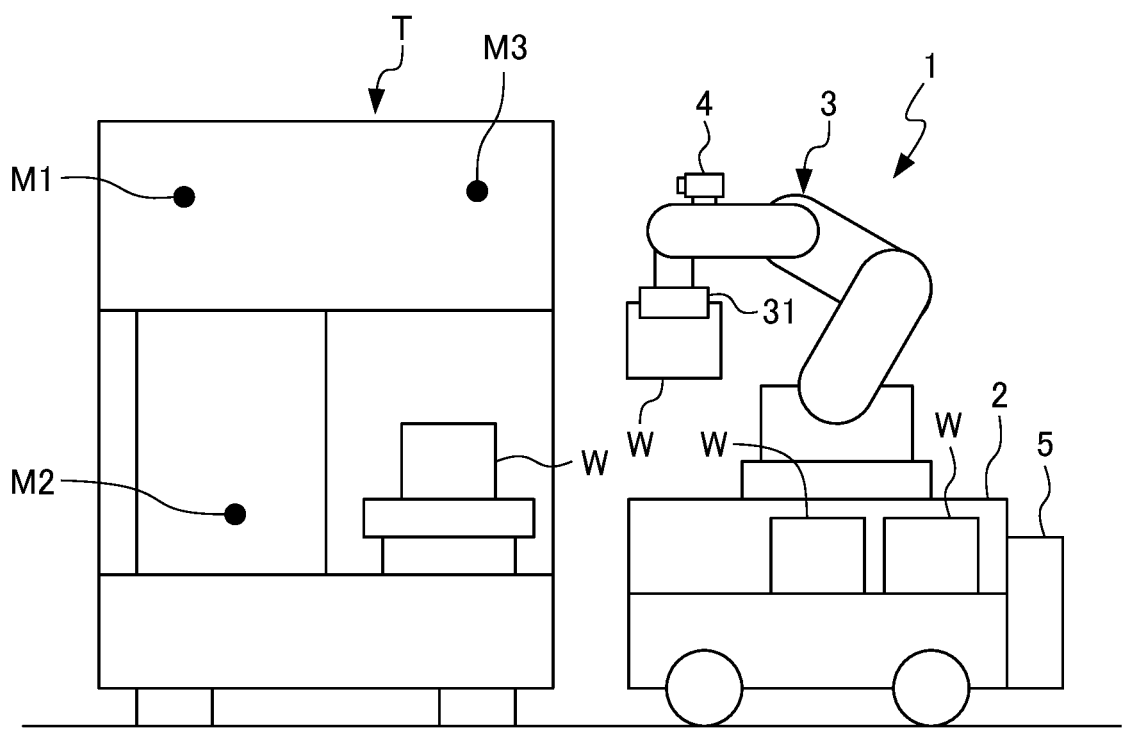
FIG. 1 is a view showing a delivery system according to an embodiment of the present disclosure.

Hereinafter, an embodiment of the present disclosure will be explained while referencing the drawings. FIG. 1 is a view showing a delivery system 100 according to an embodiment of the present disclosure.

The delivery system 100 in FIG. 1 includes one or a plurality of target devices T arranged to be immobile, and using an article W or conducting processing on an article W; and a transfer device 1 which performs delivery of the article W with the target device T. The transfer device 1 of the delivery system 100 in itself is an embodiment of a transfer device according to the present disclosure.

The target device T, although not particularly limited, can be established as a machine tool which performs machining on an article W such as a machining center, for example. In this case, the article W can be established as a workpiece (machined article). Therefore, the delivery system 100 can be established as a machining system which takes out the workpiece W after machining in the machine tool T from the machine tool T to the transfer device 1, and enables the next machining process to be executed by supplying a new workpiece W prior to machining from the transfer device 1 to the machine tool T.

The target device 1 is configured so as to deliver the article W in a specific delivery position. As a specific example, the target device T shall deliver the article W with the transfer device 1 in a state arranging a bed or the like grasping the article W at the outermost side. In other words, the target device T is configured so as to deliver the article W at a specific delivery position on its own coordinate system.

In addition, on the target device T, three compensation marks M1, M2, M3 are attached to the outer surface. The compensation marks M1, M2, M3 are at least attached at positions visibly confirmable (captured by a camera 4 described later) of positions at which the transfer device delivers the article W with the target device T. Furthermore, the compensation marks M1, M2, M3 are preferably attached at positions visibly confirmable from the transfer device 1 while the transfer device 1 approaches the target device T.

The transfer device 1 transfers the article W and performs delivery of the article W with the target device T The transfer device 1 includes: a cart 2 which is mobile; a robot arm 3 which can grasp the article W to a leading end part; the camera 4 which is provided to the robot arm 3 and captures the three compensation marks M1, M2, M3 attached to the outer surface of the target device T; and a control device 5 which enables delivery of the article W at a predetermined delivery position within the target device T, by controlling the operation of the robot arm 3 in consideration of the images captured by the camera 4.

The cart 2 is travelling equipment which grasps the article W, robot arm 3, etc., and can self-propel. The cart 2 can preferably grasp a plurality of articles W and move.

The robot arm 3 can be configured by an articulated robot having a plurality of drive axes. The robot arm 3 is provided with a hand 31 at a leading end that grasps the article W.

The camera 4 is established as at least a 2-dimensional image sensor, and may use a 3-dimension image sensor that can acquire distance information until a subject of each pixel in the 2-dimensional image. In the case of using a 2-dimensional image sensor, it is preferable to provide the camera 4 to the robot arm 3. By moving the robot arm 3 and capturing from different viewpoints by the camera 4, since it is thereby possible to calculate the distance from the parallax of a plurality images until the subject, it is possible to calculate a 3-dimensional position (coordinates) of a subject with the transfer device 1 as a reference. Hereinafter, the camera 4 will be explained as being a 2-dimensional image sensor provided to the robot arm 3.

The control device 5 can be configured by performing the appropriate programming in a computer device equipped with a CPU, memory, I/O interface, etc., for example. The control device 5 may not be built into the cart 2, and may communicate with the robot arm 3 and camera 4 via a communication device built into the cart 2. In addition, the control device 5 is preferably configured so as to be able to communicate with the target device T, in order to operate in cooperation with the target device T for the delivery of the article W. Furthermore, the control device 5 may be configured so as to communicate with an external device such as a control device that collectively manages a plurality of the target devices T.

Figure 2:
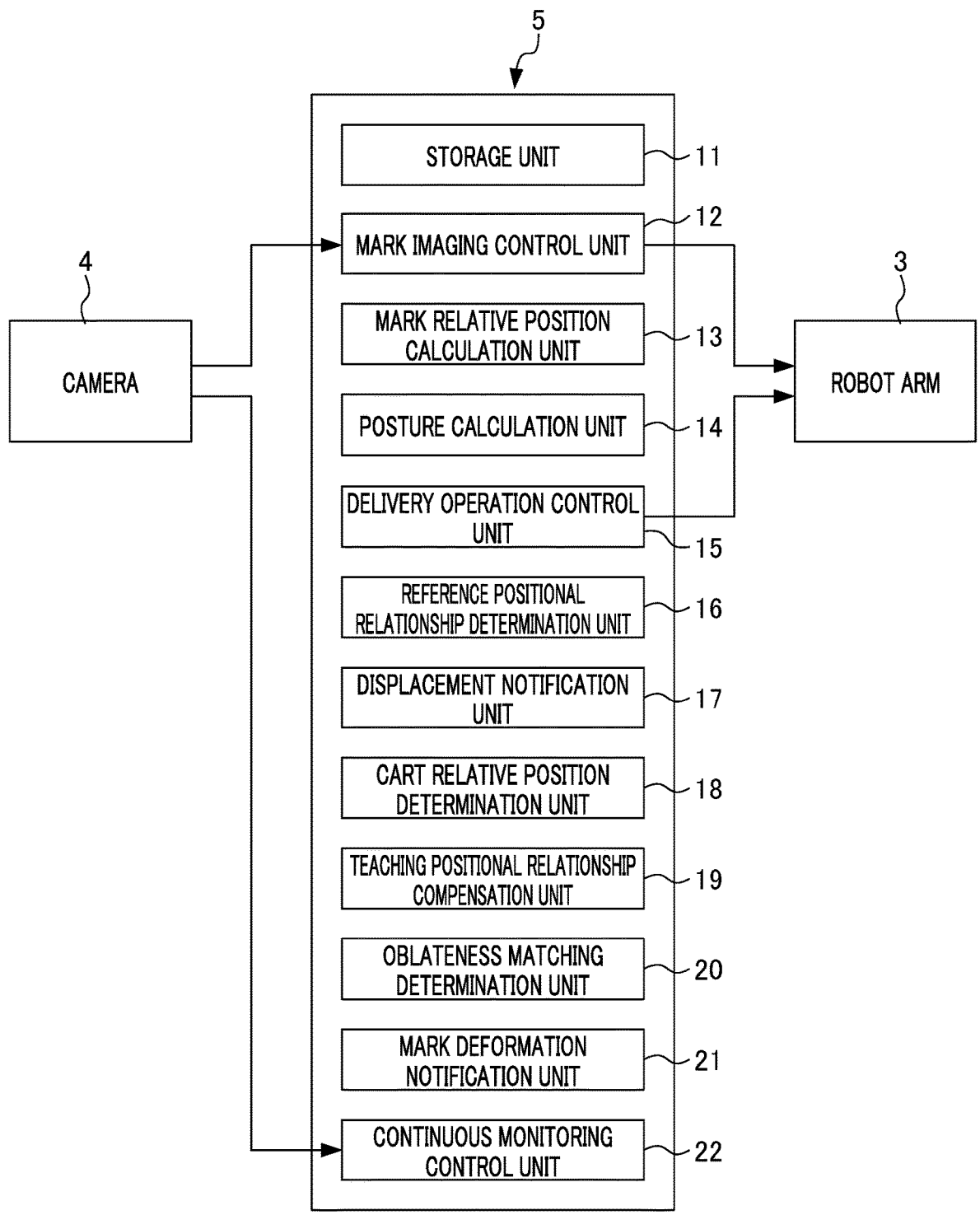
FIG. 2 is a block diagram showing the configuration of a control device in a transfer device of FIG. 1.

The control device 5, as shown in FIG. 2, has: a storage unit 11, mark imaging control unit 12, mark relative position calculation unit 13, posture calculation unit 14, delivery operation control unit 15, reference positional relationship determination unit 16, displacement notification unit 17, cart relative position determination unit 18, teaching positional relationship compensation unit 19, oblateness matching determination unit 20, mark deformation notification unit 21, and continuous monitoring control unit 22, which will be respectively explained in detail later. These constituent elements specify the functions of the control device 5, and may not necessarily be clearly distinguishable in the physical configuration and program configuration.

The storage unit 11 stores information required in the control of the transfer device 1 including images captured by the camera 4; the reference positional relationship, which is the mutual positional relationship of the three compensation marks M1, M2, M3 attached to the target device T initially, teaching positional relationship which is the positional relationship between the delivery position and the three compensation marks M1, M2, M3 to be taught, outcome of delivery of the article W with each target device T, etc. The reference positional relationship and the teaching positional relationship can be written in a format such as the absolute coordinates of the three compensation marks M1, M2, M3 and delivery position in the coordinate system of the target device T (hereinafter may be referred as world coordinate system); position vector indicating another relative position with either as a reference.

The mark imaging control unit 12 causes images including the three compensation marks M1, M2, M3 to be captured from different viewpoints in the camera 4, by causing the camera 4 to move by causing the posture of the robot arm 3 to change. Data of images captured by the camera 4 is stored in the storage unit 11. Capturing of the three compensation marks M1, M2, M3 by the camera 4 may be performed in a state in which the transfer device 1 stopped at a position adjacent to the target device T, or may be performed while the transfer device 1 is approaching the target device T.

The mark relative position calculation unit 13 calculates the relative positions of the three compensation marks M1, M2, M3 relative to the cart 2, i.e. the coordinates of the centers of each of the three compensation marks M1, M2, M3 in the coordinate system (hereinafter may be referred as local coordinate system) of the transfer device 1 with the carts 2 as reference, based on the captured images of the camera 4. More specifically, the mark relative position calculation unit 13 can be configured so as to calculate relative positions of the three compensation marks M1, M2, M3 relative to the cart 2, i.e. coordinates in the local coordinate system, from the displacement of the three compensation marks M1, M2, M3 by the parallax of the captured images from different viewpoints of the camera 4.

The posture calculation unit 14 calculates the posture of the robot arm 3 arranging the article W at the delivery position, based on the relative positions of the three compensation marks calculated by the mark relative position calculation unit 13, and the teaching positional relationship taught in advance as the positional relationship between the three compensation marks and the delivery position. More specifically, by converting the world coordinate system of the target device T to the local coordinate system of the transfer device 1, the coordinates of the delivery position in the local coordinate system is calculated, and the posture of the robot arm 3 which can position the article W in these coordinates is calculated.

The delivery operation control unit 15 controls operation of the robot arm 3 so that the robot arm 3 delivers the article W at the posture calculated by the posture calculation unit 14. The delivery operation control unit 15 preferably starts operation of the robot arm 3 after receiving a signal from the target device T indicating that the transfer device 1 is entering a state capable of performing delivery of the article W.

The delivery operation control unit 15 configures so as to be able to confirm that delivery could be completed normally later, in the case of completing delivery of the article W appropriately with the target device T. More specifically, the delivery operation control unit 15 may be configured so as to save images including the compensation marks M1, M2, M3 captured in the camera 4 by the mark imaging control unit 12, in the case that delivery of the article W could be done, and delete images including the compensation marks M1, M2, M3 in the case that delivery of the article W could not be done. It is thereby possible to judge that a previous delivery was appropriately performed, in the case of an image including the compensation marks M1, M2, M3 being saved in the storage unit 11. In addition, the delivery operation control unit 15 may be configured so as to save a compensation amount of a teaching positional relationship described later in the case that delivery of the article W could be done, and delete the compensation amount of the teaching positional relationship in the case that delivery of the article W could not be done.

The reference positional relationship determination unit 16 determines whether or not the mutual positional relationship between the three compensation marks M1, M2, M3 match the reference positional relationship set in advance and stored in the storage unit 11, based on the relative positions of the three compensation marks M1, M2, M3 calculated by the mark relative position calculation unit 13. More specifically, the reference positional relationship determination unit 16 can be configured so as to determine as the mutual positional relationship between the three compensation marks M1, M2, M3 matching the reference positional relationship, in the case of the difference between the mutual distances of the three compensation marks M1, M2, M3 calculated by the mark relative position calculation unit 13 and the mutual distances of the three compensation marks M1, M2, M3 in the reference positional relationship being no more than a threshold set in advance. In addition, the matching between the mutual positional relationship between the three compensation marks M1, M2, M3 and the reference positional relationship may be performed by comparing of the position vectors relatively indicating the position of another compensation mark with any one of the three compensation marks M1, M2, M3 as a reference.

The displacement notification unit 17 notifies to the outside of the possibility of displacement of the three compensation marks M1, M2, M3, in the case of the reference positional relationship determination unit 16 determining that the mutual positional relationship of the three compensation marks M1, M2, M3 not matching the reference positional relationship. This notification of the possibility of displacement may be performed using a notification device such as a lamp, display panel, speaker and buzzer, for example, provided to the transfer device 1, or may be performed by outputting a predetermined signal to the target device T, a control device which collectively manages the target devices T, or the like by way of communication, for example.

The cart relative position determination unit 18, in the case of the reference positional relationship determination unit 16 determining that the mutual positional relationship of the three compensation marks M1, M2, M3 does not match with the reference positional relationship, compares the current image captured by the camera 4, and an image captured by the camera 4 at the same viewpoint in the local coordinate system when performing delivery of the article W with the same target device T a previous time, and stored in the storage unit 11. The cart relative position determination unit 18 thereby determines whether the current relative position of the cart 2 relative to the target device T matches the previous relative position. Although the mark imaging control unit 12 causes the compensation marks M1, M2, M3 to be captured in the camera 4 from a plurality of viewpoints, the cart relative position determination unit 18 may simply compare images captured from any one of the same viewpoint. It should be noted that "when performing delivery of the article W" indicates when the delivery of the article W could be appropriately completed, and does not encompass when attempting delivery of the article W but not being able to appropriately complete delivery.

The teaching positional relationship compensation unit 19, in the case of the cart relative position determination unit 18 determining that the current relative position of the cart 2 relative to the target device T matches the previous relative position, compensates the teaching positional relationship so as to perform delivery of the article W in a state in which the posture of the robot arm 3 is the same as previous. This compensation of teaching positional relationship can be performed by configuring to add a compensation amount in the case of recording the compensation amounts in the world coordinate system, and using subsequent teaching positional relationships.

The oblateness matching determination unit 20 calculates the oblateness of the three compensation marks M1, M2, M3 in the same image captured by the camera 4, respectively, and determines whether the oblateness of the three compensation marks M1, M2, M3 match. The mark deformation notification unit 21, in the case of the difference between the average value of oblateness of the three compensation marks M1, M2, M3 and the maximum value or minimum value being no more than a threshold set in advance, can be configured so as to determine that the oblateness of the three compensation marks M1, M2, M3 match.

The mark deformation notification unit 21, in the case of the oblateness matching determination unit 20 determining that the oblateness of the three compensation marks M1, M2, M3 do not match, notifies to outside of the fact that any of the three compensation marks M1, M2, M3 are deformed. Such deformation of the compensation marks M1, M2, M3 is considered to be possible to occur in the case of any of the compensation marks M1, M2, M3 being dirty and not partially visible, case of a sticker pasted as the compensation marks M1, M2, M3 partly peeling, or the like. The notification of deformation by the mark deformation notification unit 21 may be performed using a notification device such as a lamp, display panel, speaker and buzzer, for example, provided to the transfer device 1, or may be performed by outputting a predetermined signal to the target device 1, a control device which collectively manages the target devices T, etc., by way of communication.

The continuous monitoring control unit 22 monitors images continuously captured by the camera 4 from the same viewpoint after the posture calculation unit 14 has calculated the posture at the time of delivery of the robot arm 3 until entering a state in which the target device T can perform delivery of the article W, and causes control by the mark imaging control unit 12, mark relative position calculation unit 13 and posture calculation unit 14 to perform again, in the case of the positions of the three compensation marks M1, M2, M3 having shifted in the images captured by the camera 4.

Figure 3:
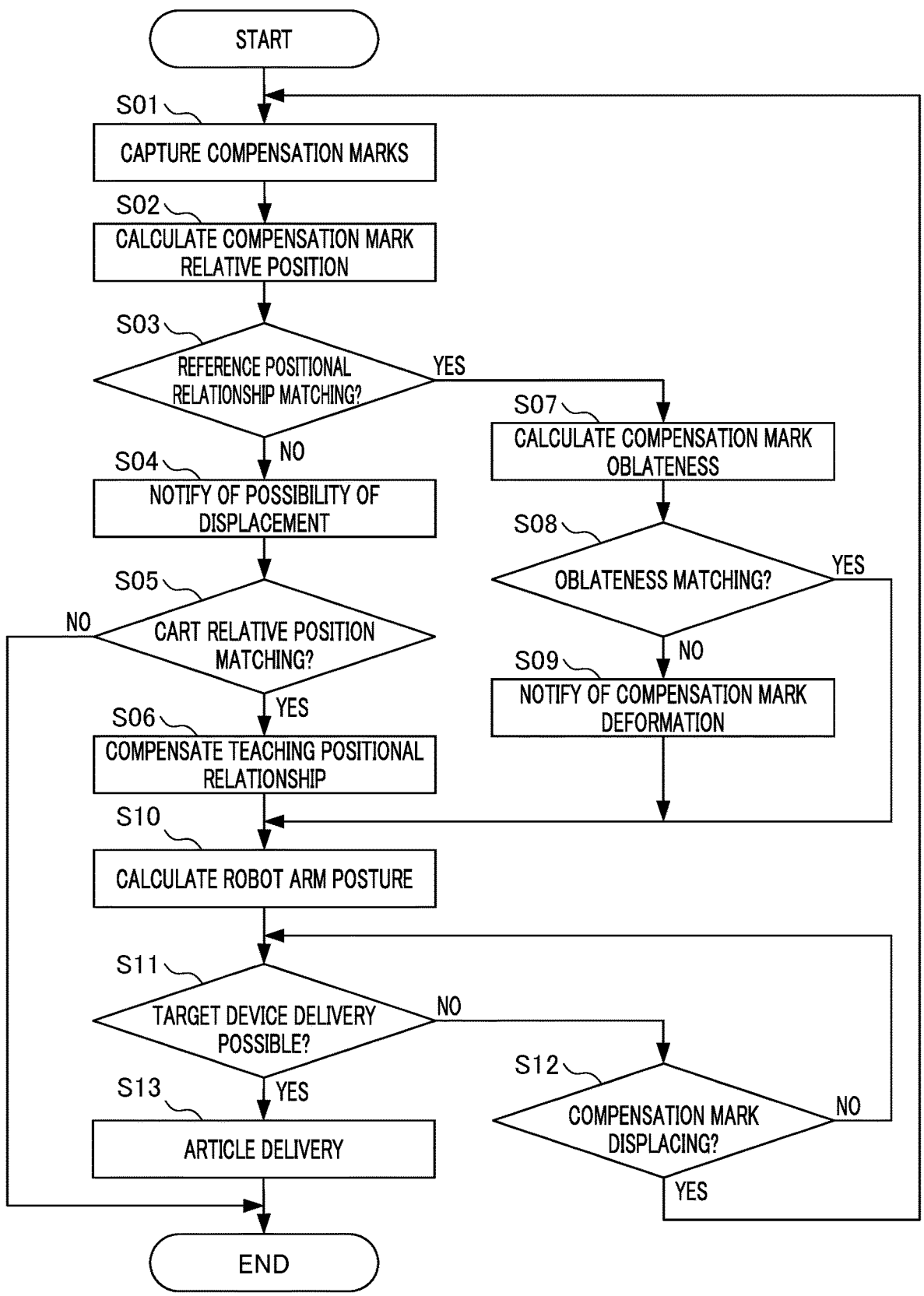
FIG. 3 is a flowchart showing a sequence of control of the transfer device of FIG. 1.

FIG. 3 shows a sequence of delivery of the article W with one target device T by the transfer device 1 having the above such configuration. Delivery of the article W includes: a compensation mark imaging step of to S01; a compensation mark relative position calculation step of Step S02; a reference positional relationship matching determination step of Step S03; a displacement possibility notification step of Step S04; a cart relative position matching determination step of Step S05; a teaching positional relationship compensation step of Step S06; an oblateness calculation step of Step S07; an oblateness matching determination step of Step S08; a compensation mark deformation notification step of Step S09; a robot arm posture calculation step of Step S10; a target device preparation confirmation step of Step S11; a compensation mark displacement determination step of Step S12; and an article delivery step of Step S13.

In the compensation mark imaging step of Step S01, the mark imaging control unit 12 causes the robot arm 3 to operate, and causes the three compensation marks M1, M2, M3 to be captured at different viewpoints in the camera 4.

In the compensation mark relative position calculation step of Step S02, the relative positions of the three compensation marks M1, M2, M3 relative to the cart 2 are calculated by the mark relative position calculation unit 13.

In the reference positional relationship matching determination step of Step S03, it is determined whether the mutual positional relationship of the three compensation marks M1, M2, M3 matches the reference positional relationship by way of the reference positional relationship determination unit 16, based on the relative positions of the three compensation marks M1, M2, M3 calculated in the compensation mark relative position compensation step. In the case of the mutual positional relationship of the three compensation marks M1, M2, M3 not matching the reference positional relationship, the processing advances to Step S04, and in the case of the mutual positional relationships of the three compensation marks M1, M2, M3 matching the reference positional relationship, the processing advances to Step S07.

In the displacement possibility notification step of Step S04, it is notified that there is possibility of any of the three compensation marks M1, M2, M3 displacing by way of the displacement notification unit 17.

In the cart relative position matching determination step of Step S05, at is confirmed whether the relative position of the target device T and cart 2 is the same as at the time of the previous delivery by way of the cart relative position determination unit 18, by comparing between the images captured by the camera 4 when the article W could be appropriately delivered with the same target device T the previous time, and the current image captured by the camera 4 from the same viewpoint. As a specific determination method, it is possible to extract a characteristic point (for example, a fourth mark, contour of device, corner of door, etc.) of the target device T other than the three compensation marks M1, M2, M3 by way of image processing, and in the case of these positions of characteristic points matching, determining that the relative position between the target device T and cart 2 is the same as at the time of the previous delivery. In the case of the relative position between the target device T and cart 2 being the same as at the time of the previous delivery, the processing advances to Step S06, and in the case of the relative position between the target device T and cart 2 not being the same as at the time of the previous delivery, since it is considered that an unrecoverable abnormality is occurring, the delivery processing on this target device T is ended without performing delivery of the article W. It should be noted that, even in a case of ending the delivery processing in this way, it may be continued to execute delivery processing on another target device T.

In the teaching positional relationship compensation step of Step S6, the teaching positional relationship compensation is compensated by way of the teaching positional relationship compensation unit 19 so the posture of the robot arm 3 at the time of delivery becomes the same as at the time of the previous delivery, in the case of calculating the delivery position on the basis of the current three compensation marks M1, M2, M3.

In the oblateness calculation step of Step S7, the oblateness of each of the three compensation marks M1, M2, M3 in one image captured by the camera 4 is calculated by the oblateness matching determination unit 20.

In the oblateness matching determination step of Step S8, it is determined whether the oblateness of the three compensation marks M1, M2, M3 match by the oblateness matching determination unit 20. In the case of the oblateness of the three compensation marks M1, M2, M3 not matching, the processing advances to Step S09, and in the case of the oblateness of the three compensation marks M1, M2, M3 matching, the processing advances to Step S10.

In the compensation mark deformation notification step of Step S9, the event of any of the three compensation marks M1, M2, M3 deforming is notified by the mark deformation notification unit 21.

In the robot arm posture calculation step of Step S10, the posture of the robot arm necessitated at the time of delivery of the article W, i.e. target positions of each of a plurality of drive axes, is calculated by the posture calculation unit 14.

In the target device preparation confirmation step of Step S11, it is confirmed whether the target device T has entered a state able to perform delivery of the article W. In the case of the target device T not having entered a state able to perform delivery of the article W, the processing advances to Step S12, and in the case of the target device T having entered a state able to perform delivery of the article W, the processing advances to Step S13.

In the compensation mark displacement determination step of Step S12, an image including the three compensation marks M1, M2, M3 is captured again by the camera 4 from the same viewpoint as captured in Step S01, and determination is performed by the continuous monitoring control unit 22 as to whether or not the positions of the three compensation marks M1, M2, M3 in the captured image are shifted. In the case of the positions of the compensation marks M1, M2, M3 shifting, the processing returns to Step S01, and control is restarted from the beginning. In the case of the positions of the compensation marks M1, M2, M3 not shifting, the processing returns to Step S11.

In the article delivery step of Step S13, the robot arm 3 is controlled so as to become the posture calculated in the robot arm posture calculation step, and thereby delivery of the article W performed with the target device T. In the case of completing the article delivery step, the delivery processing with this target device T is ended.

In the delivery system 100 explained above, the control device 5 of the transfer device 1 has: the reference positional relationship determination unit 16 which determines whether the mutual positional relationship of the three compensation marks M1, M2, M3 matches the reference positional relationship set in advance, based on the relative positions of the three compensation marks M1, M2, M3 calculated by the mark relative position calculation unit 13; and the displacement notification unit 17 which notifies to outside of the possibility of displacement of the three compensation marks M1, M2, M3, in the case of the reference positional relationship determination unit 16 determining that the mutual positional relationships of the three compensation marks M1, M2, M3 not matching the reference positional relationship. In the case of there being concern over not being able to appropriately perform delivery of the article W between the transfer device 1 and target device T due to displacing of the three compensation marks M1, M2, M3 for any reason, it is thereby possible for the delivery system 100 to let the operator know of this event and prompt appropriate handling.

In addition, the control device 5 further has: the cart relative position determination unit 18 which compares the current image captured by the camera 4 and an image captured by the camera 4 when performing delivery of the article W with the same target device T1 the previous time, in the case of the reference positional relationship determination unit 16 determining that the three compensation marks M1, M2, M3 do not match the reference positional relationship, and thereby determines whether the current positional relationship of the cart 2 relative to the target device T1 matches the previous relative position; and the teaching positional relationship compensation unit 19 which compensates the teaching positional relationship so as to perform delivery of the article W in a state in which the posture of the robot arm 3 is the same as the previous time, in the case of the cart relative position determination unit 18 determining that the current relative position matches the previous relative position. It is thereby possible for the delivery system 100 to enable compensation of displacement of the compensation marks M1, M2, M3 so long as the cart 2 is at the same position as at the time of the previous delivery, and thereby appropriately perform delivery processing thereafter, even in a case of the three compensation marks M1, M2, M3 having displaced for any reason.

In addition, the control device 5 further has: the oblateness matching determination unit 20 which determines whether the oblateness of the three compensation marks M1, M2, M3 in an image captured by the camera 4 match; and the mark deformation notification unit which notifies to outside of deformation of the three compensation marks M1, M2, M3 in a case of the oblateness matching determination unit 20 determining that the oblateness of the three compensation marks M1, M2, M3 do not match. It is thereby possible for the delivery system 100 to detect staining or peeling of the compensation marks M1, M2, M3 at an early stage, and thereby prompt appropriate handling by the operator.

In addition, the control device 5 further has: the continuous monitoring control unit 22 which monitors the images continuously captured by the camera 4 from the same viewpoint until the target device T enters a state able to perform delivery of the article W after the posture of the robot arm 3 is calculated by the posture calculation unit 14, and in the case of the positions of the three compensation marks M1, M2, M3 in the image captured by the camera 4 being shifted, causes control by the mark relative position calculation unit 13 and posture calculation unit 14 to be performed again. It is thereby possible to perform recalculation and appropriately deliver the article W, also in a case of the relative position between the transfer device 1 and target device T having shifted for any cause, while the transfer device 1 stops at a position adjacent to the target device T, and stands by until the target device T enters a state able to perform delivery of the article W.

In addition, in the transfer device 1, the camera 4 is provided to the robot arm 3, and the control device 5 further has the mark imaging control unit 12 which causes the three compensation marks M1, M2, M3 to be captured from different viewpoints in the camera 4 by causing the camera 4 to move by way of the robot arm 3. It is thereby possible to accurately compensate for a shift between the local coordinate system of the transfer device 1 and the world coordinate system of the target device T using the camera 4 having relatively high resolution.

The delivery system 100 equipped with the above such transfer device 1 can appropriately handle displacement and staining of the compensation marks M1, M2, M3.

In addition, the delivery system 100 can shorten the cycle time of the exchanging work of articles W between the transfer device 1 and transfer device T, by the three compensation marks M1, M2, M3 being attached to positions which can be captured by the camera 4 while the transfer device 1 is approaching the target device T.

Although an embodiment of a transfer device and delivery system according to the present disclosure has been explained above, the transfer device and delivery system according to the present disclosure are not to be limited to the aforementioned embodiment. In addition, the effects described in the present embodiment are merely listing the most preferred effects produced from the present disclosure, and the effects from the transfer device and delivery system according to the present disclosure are not limited to those described in the present embodiment.

In the transfer device according to the present disclosure, the three compensation marks M1, M2, M3 are not necessarily included simultaneously in one image, and may be captured separately. In the continuous monitoring control unit 22, it is not necessary to capture from the same viewpoint as Step S01, so long as monitoring any one of the compensation marks M1, M2, M3, and capturing may be done from a news viewpoint for monitoring.

In the transfer device according to the present disclosure, the cart is not limited to being self-propelled, and may be driven by an external motive force via a chain or the like, for example. In addition, the cart may be moving on a track, or may be moving along a guide.

In the transfer device according to the present disclosure, the robot arm is not limited to an articulated robot, and can have any configuration such as a SCARA robot, Cartesian coordinate robot or parallel link robot, for example.

In the transfer device according to the present disclosure, in the case of using a 3-dimensional image sensor as the camera, the mark imaging control unit is sufficient so long as capturing an image including the three compensation marks from one viewpoint in the camera. In addition, in this case, the continuous monitoring control unit 22 may cause the relative positions of the three compensation marks to be calculated in the mark relative position calculation unit using the image upon determining that the three compensation marks displaced, and may cause the posture at the time of delivery of the robot arm to be calculated in the posture calculation unit using these calculation results.

In the control device of the transfer device according to the present disclosure, the cart relative position determination unit, teaching positional relationship compensation unit, oblateness matching determination unit, mark deformation notification unit and continuous monitoring control unit can be omitted.

EXPLANATION OF REFERENCE NUMERALS 1 transfer device
2 cart
3 robot arm
4 camera
5 control device
11 storage unit
12 mark imaging control unit
13 mark relative position calculation unit
14 posture calculation unit
15 delivery operation control unit
16 reference positional relationship determination unit
17 displacement notification unit
18 cart relative position determination unit
19 teaching positional relationship compensation unit
20 oblateness matching determination unit
21 mark deformation notification unit
22 continuous monitoring control unit
31 hand
100 delivery system
M1, M2, M3 compensation mark
T target device
W article

What is claimed is:

1. A transfer device for performing delivery of an article to a target device, the transfer device comprising:
a mobile cart;
a robot arm provided to the cart and able to grasp the article at a leading end thereof;
a camera provided to the cart or the robot arm, and capturing three compensation marks which are attached to an outer surface of the target device; and
a control device which enables delivery of the article at a predetermined delivery position in the target device, by controlling operation of the robot arm in consideration of an image captured by the camera,
wherein the control device includes:
a mark relative position calculation unit which calculates a relative position of the three compensation marks relative to the cart, based on a captured image of the camera;
a posture calculation unit which calculates a posture of the robot arm which arranges the article at the delivery position, based on a relative position of the three compensation marks calculated by the mark relative position calculation unit, and a teaching positional relationship which is taught in advance as a positional relationship between the three compensation marks and the delivery position;
a reference positional relationship determination unit which determines whether a mutual positional relationship between the three compensation marks matches with a reference positional relationship set in advance, based on the relative positions of the three compensation marks calculated by the mark relative position calculation unit; and
a displacement notification unit which notifies to outside of a possibility of displacement of the three compensation marks, in a case of the reference positional relationship determination unit determining that the mutual positional relationship of the three compensation marks does not match with the reference positional relationship.

2. The transfer device according to claim 1, wherein the control device further includes:
a storage unit which stores an image captured by the camera;
a cart relative position determination unit which, in a case of the reference positional relationship determination unit determining that the mutual positional relationship of the three compensation marks do not match the reference positional relationship, compares a current image captured by the camera and an image captured by the camera when performing delivery of an article with the same target device at a previous time, and thereby determines whether a current relative position of the cart relative to the target device matches a previous relative position; and
a teaching positional relationship compensation unit which, in a case of the cart relative position determination unit determining that the current relative position of the cart relative to the target device matches with the previous relative position, compensates the teaching positional relationship so as to perform delivery of the article in a state in which the posture of the robot arm is the same as the previous time.

3. The transfer device according to claim 1,
wherein the control device further includes:
an oblateness matching determination unit which determines whether oblateness of the three compensation marks in the image captured by the camera match; and
a mark deformation notification unit which notifies to outside of deformation of the three compensation marks, in a case of the oblateness matching determination unit determining that the oblateness of the three compensation marks do not match.

4. The transfer device according to claim 1, wherein the control device further includes: a continuous monitoring control unit which monitors images continuously captured by the camera from the same viewpoint, after the posture calculation unit calculates the posture of the robot arm until the target device enters a state able to perform delivery of the article, and in a case of the positions of at least one of the three compensation marks in the image captured by the camera being shifted, causes control by the mark relative position calculation unit and the posture calculation unit to be performed again.

5. The transfer device according to claim 1,
wherein the camera is provided to the robot arm, and
wherein the control device further has a mark imaging control unit which causes the three compensation marks to be captured by the camera from different viewpoints, by causing the camera to move by way of the robot arm.

6. A delivery system comprising:
the transfer device according to claim 1; and
a target device having the three compensation marks attached to an outer surface thereof, and performing delivery of the article with the transfer device.

7. The delivery system according to claim 6, wherein the three compensation marks are attached at positions which can be captured by the camera also while the transfer device approaches the target device.

* * * * *